UNITED STATES PATENT OFFICE.

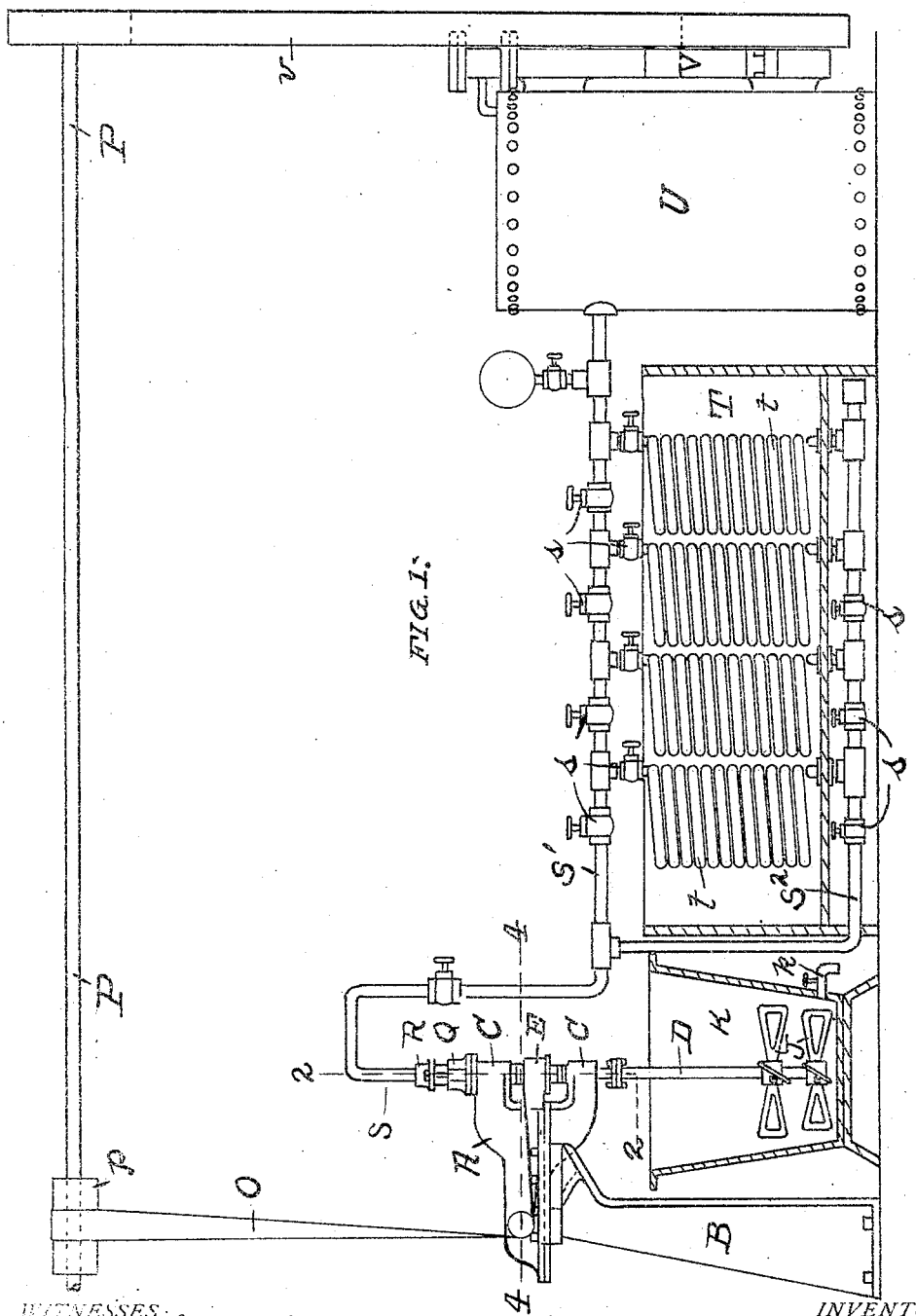

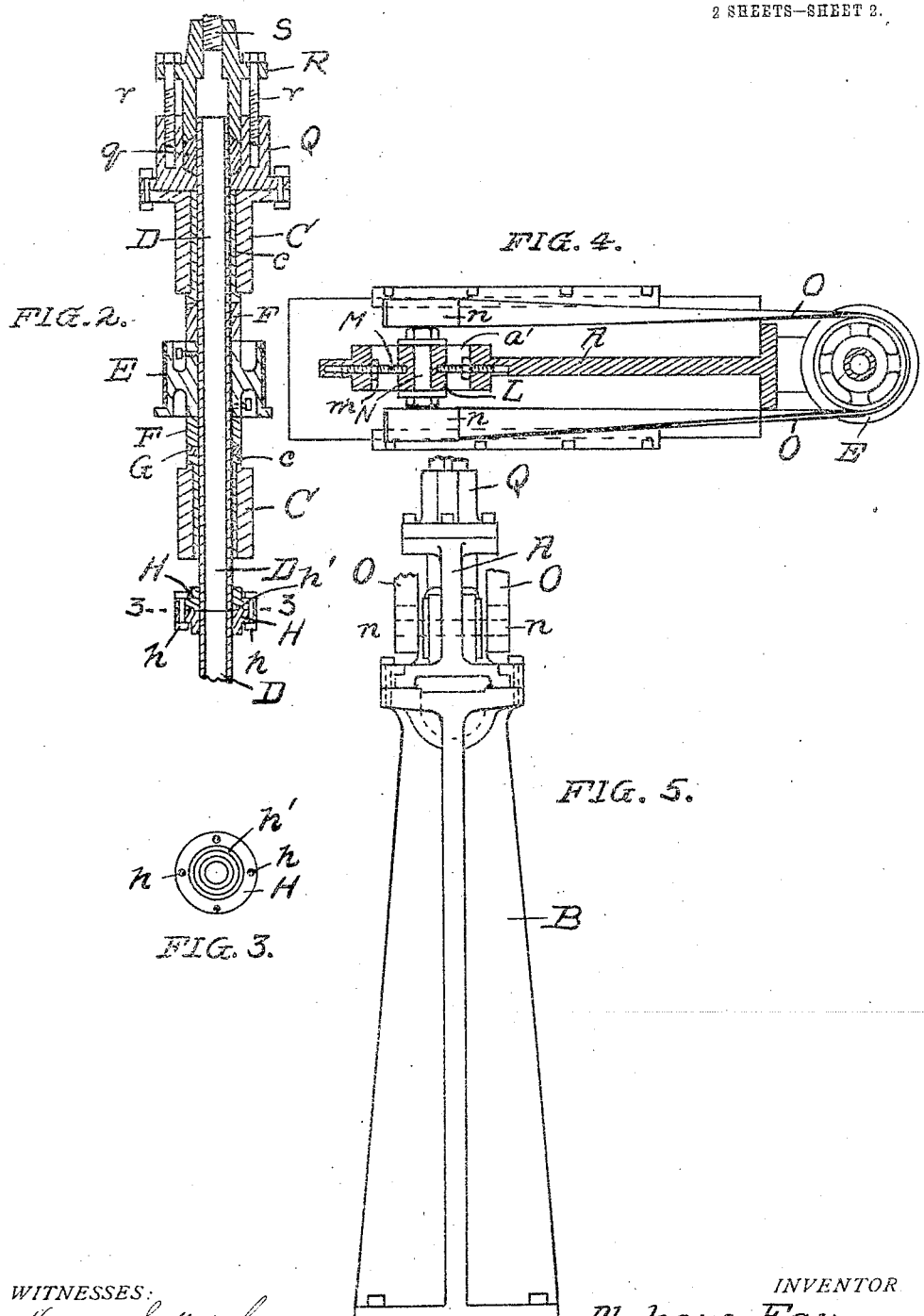

ALPHEUS FAY, OF LOUISVILLE, KENTUCKY.

APPARATUS FOR TREATING BUTTER.

No. 835,488.     Specification of Letters Patent.     Patented Nov. 6, 1906.

Application filed July 7, 1906. Serial No. 325,134.

*To all whom it may concern:*

Be it known that I, ALPHEUS FAY, a citizen of the United States, residing at Louisville, in the county of Jefferson and State of Kentucky, have invented a certain new and useful Improvement in Apparatus for Treating Butter, of which the following is a specification.

The object of my invention is to provide apparatus for treating a poor quality of butter whereby the butter may be improved in quality and rendered pure, sweet, and palatable.

My invention consists in the combination and arrangement of parts hereinafter described and claimed.

In the drawings, Figure 1 is a side elevation of apparatus embodying my invention; Fig. 2, an enlarged section on line 2 2 of Fig. 1; Fig. 3, a section on line 3 3 of Fig. 2; Fig. 4, an enlarged section on line 4 4 of Fig. 1, and Fig. 5 an enlarged end view of the apparatus.

A head A is slidably mounted on a standard B and provided with bearings C, in which are mounted the hollow shaft D. The bearings C are preferably provided with bronze bushings $c$ to reduce friction. A pulley E is secured to shaft D between bearings C and collars F, interposed between the hub of pulley E and bushings $c$. A fiber washer G is preferably interposed between the lower collar F and bushing $c$ to reduce friction. The shaft D is made in two sections secured together by means of plates H, which are threaded to the ends of the shaft-sections and secured together by bolts $h$. In order to insure perfect alinement between the shaft-sections, one of the plates H is provided with an annular rib $h'$, taking into a corresponding socket in the other plate. The lower section of shaft D carries agitators J, operating in vessel K, which contains the butter to be treated. The vessel K is preferably made of cast-iron lined with enamel and is provided with a faucet $k$ for draining. It will be seen that by uncoupling the lower section of shaft D the vessel K may be readily removed or replaced in position and that the annular rib $h'$ insures perfect alinement of the shaft-sections when recoupled.

At the rear, head A is provided with a bearing-block L, slidably mounted in a slot $a'$ and rendered adjustable in position by means of threaded shafts M and lock-nuts $m$. Block L carries a shaft N, on which pulleys $n$ are loosely mounted, and a belt O, passed over pulleys E and $n$ to a pulley on shaft P to drive-shaft D. The pulley $p$ is considerably wider than the belt O, so as to carry the belt when in different positions. By this arrangement the head A may be adjusted to different positions to accommodate different sizes of vessels K, the tension in the belt being adjusted by means of nuts $m$.

The upper bearing C carries a packing-casing Q, in which the upper end of shaft D terminates. A packing-ring $q$ is placed in casing Q around shaft D and is compressed against the shaft by means of cap R, which may be drawn into the casing by means of screw-bolts $r$. An air-pipe S is fitted into cap R, so as to supply air to hollow shaft D while rotating.

The pipe S connects with pipes S' and $S^2$, which pass above and below coils $t$ in tank T. The ends of the coils are connected with pipes S' and $S^2$ and stop-cocks $s$ provided, so that air in pipe S' may be delivered directly to pipe S or sent through one or more of coils $t$ before reaching pipe S. A cooling medium is placed in tank T, and it will be seen that the air delivered to pipe S, and thus to shaft D, may be cooled to different degrees of temperature by passing it through one or more of the coils $t$. Pipe S' connects with air-tank U, which is supplied with air under pressure by means of a pump V, driven by a belt $v$ from shaft P.

In operation the butter to be treated, which may be of a poor quality or even slightly rancid, is placed in vessel K with a solution or mixture containing pure milk or cream elements. This solution or mixture may be fresh sweet milk or cream or fresh sweet milk or cream from which the butter has been removed or it may be buttermilk. The mixture is then thoroughly mixed and agitated by means of agitators J and cooled air from pipe S passed into the mixture to bring it to a temperature of from 35° to 40° Fahrenheit. This treatment is continued for from twenty-five to thirty minutes, during which the butter is thoroughly broken up, remixed with the pure-milk elements, and purified by the air. The solid milk elements in the soluton are separated therefrom and absorbed by the butter, thus rendering it sweet and palatable and increasing its weight considerably. If desired, coloring-matter may be added to the solution, from which it will be absorbed by the butter being treated. A poor quality of butter thus treated becomes perfectly sweet, pure, and palatable. After this treatment is finished warm air is supplied until the mixture is about 55° Fahrenheit, when the supply of air is cut off and the butter particles regathered by running the shaft D slowly for a few minutes, when it may be washed and treated with salt in the usual manner.

While I have shown and described the preferred construction for carrying my invention into effect, this is capable of modification without departing from the spirit of the invention. I therefore do not wish to be limited to the exact construction shown in the drawings; but

What I claim as new, and desire to secure by Letters Patent, is—

1. In butter-treating apparatus, the combination of a mixing vessel; a hollow shaft rotatably mounted in the vessel; agitators on the shaft; pipe S for supplying air to the shaft; branch pipes S' and S² connected with coils t in a cooling-tank; stop-cocks for directing the passage of air through one or more of the coils; and means for supplying air under pressure to pipes S' and S², substantially as specified.

2. In butter-treating apparatus, the combination of a mixing vessel; a hollow shaft rotatably mounted in the vessel; agitators on the shaft; pipe S for supplying air to the shaft; branch pipes S' and S² connected with coils t in a cooling-tank; stop-cocks s for directing the passage of air through one or more of the coils; tank U connected with pipe S'; and air-pump V for supplying air under pressure to tank U, substantially as specified.

3. In butter-treating apparatus, the combination of a head A mounted on standard B; bearings C on head A; hollow shaft D rotatably mounted in bearings C; agitators on the shaft; a pulley E mounted on shaft D between bearings C; a belt for operating pulley E; a packing-casing Q on the upper bearing C; a packing-ring q and cap R for packing the upper end of shaft D; an air-pipe S connected with cap R; and means for supplying air under pressure to pipe S, substantially as specified.

4. In butter-treating apparatus, the combination of a head A mounted slidably on standard B; bearing C on head A; hollow shaft D rotatably mounted in bearings C; agitators on the shaft; a pulley E mounted on shaft D between bearings C; pulleys n adjustably mounted in head A; a belt O passing over pulleys E and n; a packing-casing Q on the upper bearing C; a packing-ring q and cap R for packing the upper end of shaft D; an air-pipe S connected with cap R; and means for supplying under pressure to pipe S, substantially as specified.

5. In butter-treating apparatus, the combination of a head A mounted on standard B; bearings C on head A; hollow shaft D rotatably mounted in bearings C and made in two sections secured together by plates H; agitators on the shaft; a pulley C mounted on shaft D between bearing C; a belt for operating pulley E; a packing-casing Q on the upper bearing C; a packing-ring q and cap R for packing the upper end of shaft D; an air-pipe S connected with cap R, and means for supplying air under pressure to pipe S, substantially as specified.

6. In butter-treating apparatus, the combination of a head A, mounted slidably on standard B; bearings C on head A; hollow shaft D rotatably mounted in bearing C and made in two sections secured together by plates H; agitators on the shaft; a pulley C mounted on shaft D between bearings C; pulleys n adjustably mounted in head A; a belt O passing over pulleys E and n; a packing-casing Q on the upper bearing C; a packing-ring q and cap R for packing the upper end of shaft D; an air-pipe S connected with cap R; and means for supplying air under pressure to pipe S, substantially as specified.

7. In butter-treating apparatus, the combination of a head A, mounted on standard B; bearings C on head A; hollow shaft D rotatably mounted in bearings C; agitators on the shaft; a pulley E mounted on shaft D between bearing C; a belt for operating pulley E; a packing-casing Q on the upper bearing C; a packing-ring q and cap R for packing the upper end of shaft D; air-pipe S connected with cap R; means for supplying air under pressure to pipe S; and means for regulating the temperature of the air; substantially as specified.

8. In butter-treating apparatus, the combination of a head A mounted slidably on standard B; bearings C on head A; hollow shaft D rotatably mounted in bearings C; agitators on the shaft; a pulley E mounted on shaft D between bearings C; a belt for operating pulley E; a packing-casing Q on the upper bearing C; a packing-ring q and cap R for packing the upper end of shaft D; and air-pipe S connected with cap R; means for supplying air under pressure to pipe S; branch pipes S' and S² connected with coils t in a cooling-tank; stop-cocks s for directing the passage of air through one or more of the coils; and means for supplying air under pressure to pipes S' and S², substantially as specified.

9. In butter-treating apparatus, the combination of a head A slidably mounted on standard B; bearings C on head A; hollow shaft D rotatably mounted in bearings C; agitators on the shaft; a pulley E mounted on shaft D between bearings C; pulleys n adjustably mounted in head A; a belt O passing over pulleys E and n; a packing-casing Q on the upper bearing C; a packing-ring q and cap R for packing the upper end of shaft D; air-pipe S connected with cap R; means for supplying air under pressure to pipe S; branch pipes S' and S² connected with coils t in a cooling-tank; stop-cocks s for directing the passage of air through one or more coils; and means for supplying air under pressure to pipes S' and S², substantially as specified.

ALPHEUS FAY.

Witnesses:
EDWIN W. KEMPER,
BRAYTON G. RICHARDS.